(12) United States Patent
Bouziat et al.

(10) Patent No.: US 12,524,991 B2
(45) Date of Patent: Jan. 13, 2026

(54) METHOD FOR DETECTING AND COUNTING AT LEAST ONE GEOLOGICAL CONSTITUENT OF A ROCK SAMPLE

(71) Applicant: IFP Energies nouvelles, Rueil-Malmaison (FR)

(72) Inventors: Antoine Bouziat, Rueil-Malmaison (FR); Sylvain Desroziers, Rueil-Malmaison (FR); Mathieu Feraille, Rueil-Malmaison (FR); Vincent Clochard, Rueil-Malmaison (FR); Youri Hamon, Rueil-Malmaison (FR); Jean-Claude Lecomte, Rueil-Malmaison (FR); Abdoulaye Koroko, Rueil-Malmaison (FR); Antoine Lechevallier, Menucourt (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 397 days.

(21) Appl. No.: 18/042,660

(22) PCT Filed: Aug. 16, 2021

(86) PCT No.: PCT/EP2021/072698
§ 371 (c)(1),
(2) Date: Feb. 23, 2023

(87) PCT Pub. No.: WO2022/048891
PCT Pub. Date: Mar. 10, 2022

(65) Prior Publication Data
US 2023/0316713 A1 Oct. 5, 2023

(30) Foreign Application Priority Data
Sep. 2, 2020 (FR) ........................ 2008909

(51) Int. Cl.
*G06V 10/764* (2022.01)
*G01N 33/24* (2006.01)
(Continued)

(52) U.S. Cl.
CPC ........... *G06V 10/764* (2022.01); *G01N 33/24* (2013.01); *G06V 10/774* (2022.01); *G06V 10/82* (2022.01)

(58) Field of Classification Search
None
See application file for complete search history.

(56) References Cited

U.S. PATENT DOCUMENTS

| 10,922,574 | B1 * | 2/2021 | Tariq | G06V 10/25 |
| 2022/0067420 | A1 * | 3/2022 | Alatwah | G06N 3/04 |
| 2022/0207079 | A1 * | 6/2022 | Shebl | G06N 3/0442 |

FOREIGN PATENT DOCUMENTS

| CN | 209102420 U | * | 7/2019 |
| EP | 3637154 A1 | | 4/2020 |
| WO | 2015132531 A1 | | 9/2015 |

OTHER PUBLICATIONS

Mathieu et al.; "Manuel de micropaléontologie", published in 2011 (ISBN 978-2-916733-04-3), http://www.marinespecies.org/foraminifera/index.php.
(Continued)

*Primary Examiner* — Leon Viet Q Nguyen
(74) *Attorney, Agent, or Firm* — Fitch, Even, Tabin & Flannery LLP

(57) ABSTRACT

The present invention is a method of detecting and counting a geological constituent (cge) of an acquired image of a rock sample (IER), by a location detection machine learning method (ALG).

18 Claims, 2 Drawing Sheets

(51) Int. Cl.
*G06V 10/774* (2022.01)
*G06V 10/82* (2022.01)

(56) References Cited

OTHER PUBLICATIONS

Beaufort, L., et al.; "Automatic Recognition of Coccoliths", Dynamical Neural Networks, Marine Micropaleontology, 51(1-2), 57-73. (2004).
Thompson, S., et al.; "Mineral Identification Using Artificial Neural Networks and the Rotating Polarizer Stage", Computers & Geosciences, 27(9), 1081-1089, [2001].
Carvalho, L.E., et al.; "Automated Microfossil Identification and Segmentation Using a Deep Learning Approach", Marine Micropaleontology, 158 (2020) 101890.
Liu, X, et al.; "Research on Intelligent Identification of Rock Types Based on Faster R-CNN Method", IEEE Acess, vol. 8, pp. 21804-21812, Jan. 20, 2020.
Maitre, J., et al.; "Mineral Grains Recognition Using Computer Vision and Machine Learning", Computers and Geosciences 130, pp. 84-93, (2019).
International Search Report for PCT/EP2021/072698, dated Oct. 22, 2021; 4 pages.

\* cited by examiner

[Fig 1]
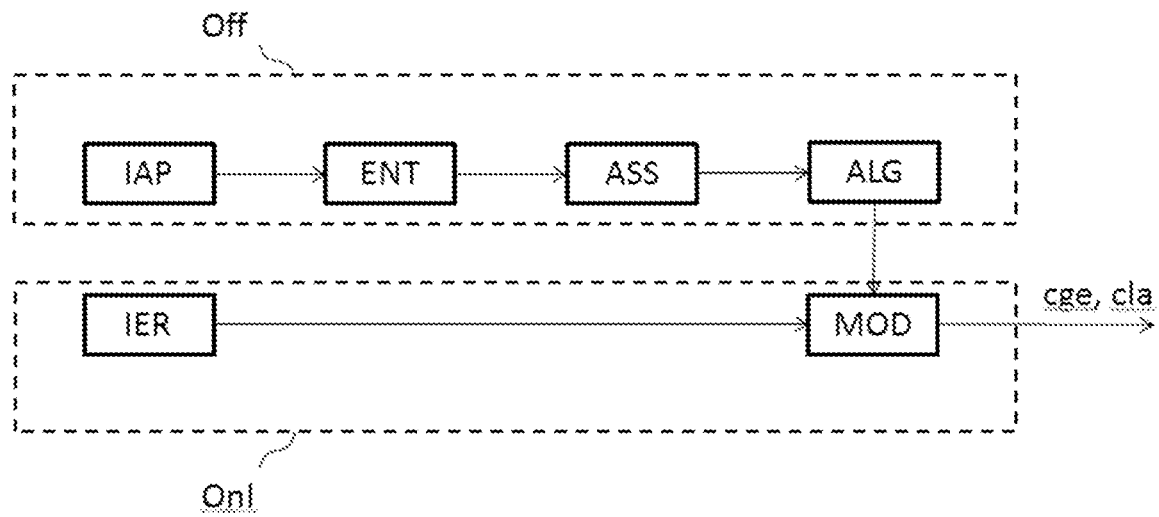
[Fig 2]
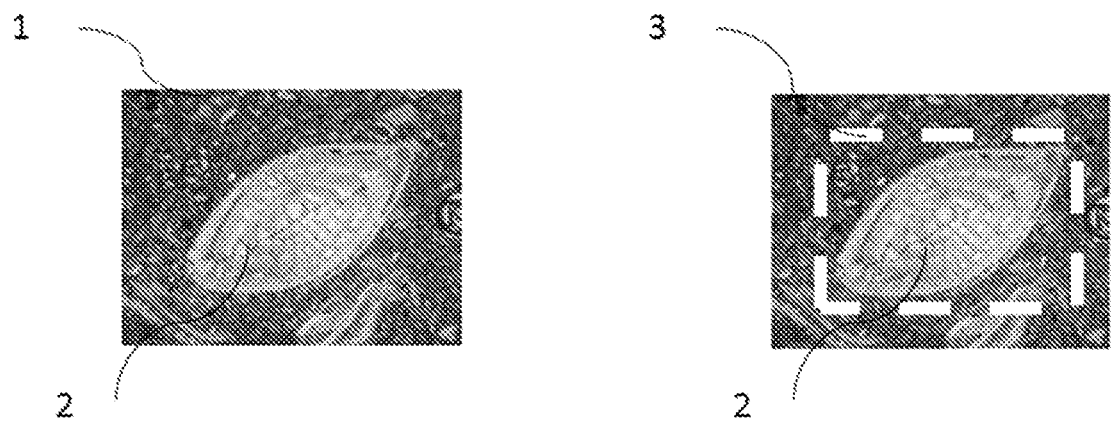
[Fig 3]
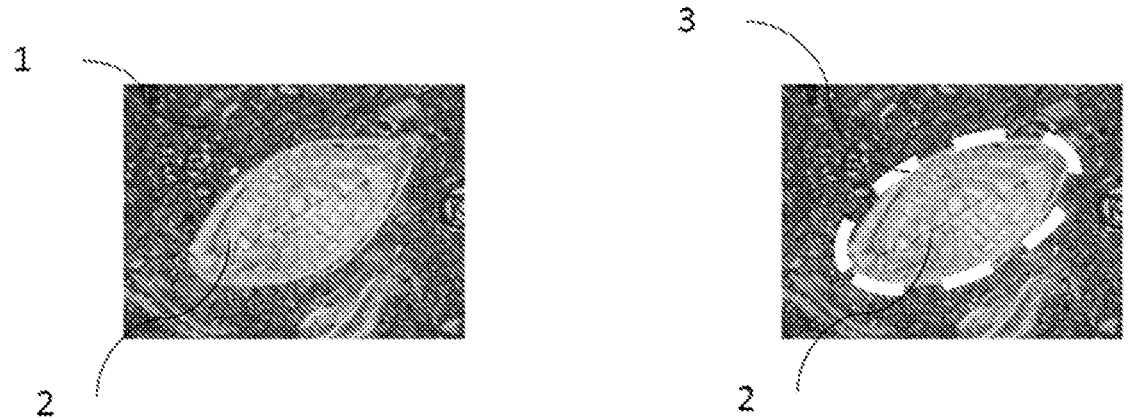

[Fig 4]
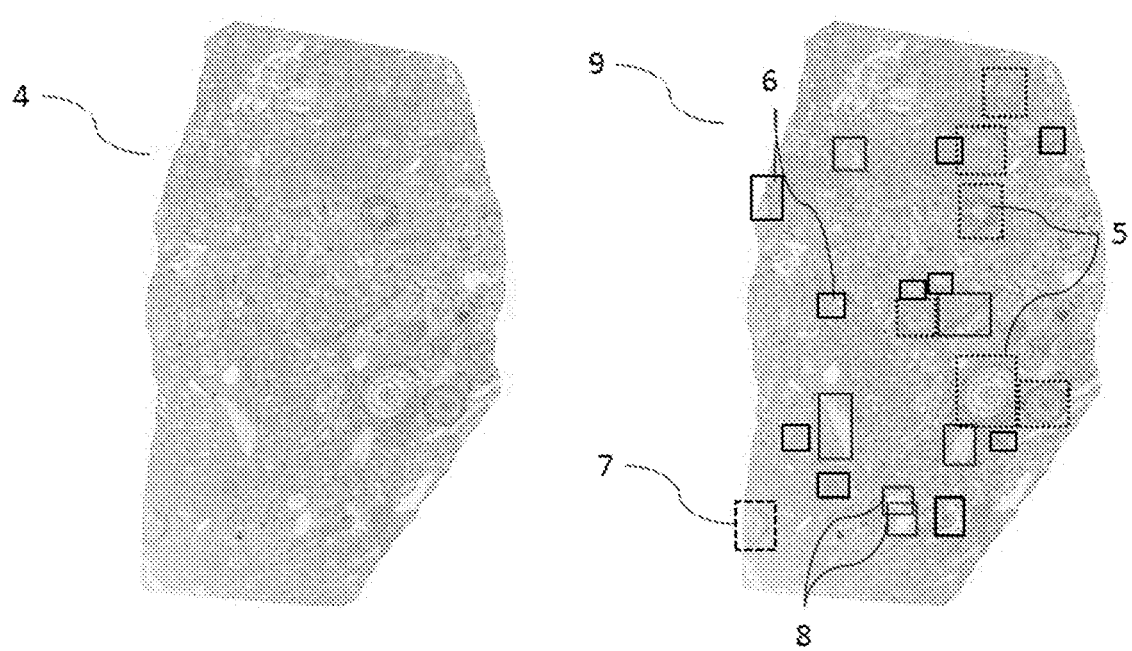

METHOD FOR DETECTING AND COUNTING AT LEAST ONE GEOLOGICAL CONSTITUENT OF A ROCK SAMPLE

CROSS REFERENCE TO RELATED APPLICATIONS

Reference is made to International Application No. PCT/EP2021/072698, filed Aug. 16, 2021, and French Application No. 20/08.909 filed Sep. 2, 2020, which are incorporated herein by reference in their entirety.

BACKGROUND OF THE INVENTION

Field of the Invention

The present invention relates to the field of detection of geological constituents of a rock sample.

Description of the Prior Art

Characterization of a rock sample often requires detecting and counting some specific constituents present in the sample such as, for example, microfossils, nanofossils, plant debris, minerals, pollen spores, or similar. For specialists, this can notably be done by observing the rock sample directly with the naked eye, or by cutting a thin slice, referred to as thin section which is studied with the light microscope. This allows categorization of the rock more precisely estimating the physical properties thereof, for civil engineering applications, site remediation, search for underground minerals or energy resources, etc.

Furthermore, when these geological constituents are microfossils (micropaleontology) or plant fragments (palynology) in sedimentary rocks, this type of analysis makes it possible to estimate both the age, the environment (marine, coastal, continental, . . . ) and the climatic context at the time of sediment deposition. Applied to several samples of the same sedimentary succession, it becomes a mechanism for reconstructing the climate evolution in a geographical area through geologic ages (paleoclimatology).

Detecting and counting some geological constituents is traditionally done manually by a human expert, which requires suitable training and can often be very tedious.

As for microfossils, the work entitled Manuel de micropaléontologie, published in 2011 by Mathieu, Bellier and Granier (ISBN 978-2-916733 Apr. 3), can notably be consulted, as well as the foraminifera database on the website http://www.marinespecies.org/foraminifera/index.php. Such a database comprises a very large data volume. This data base can therefore only be used by an expert, and not in an automated process.

As for minerals, a comparable document is the petrography atlas written in 2001 by Mckenzie and Guilford, published by Dunod (ISBN 978-2-100054-59-6).

As for pollen, the work entitled Paleopalynology, published by Alfred Traverse in 2007 (ISBN 978-1-4020-5610-9), can be consulted.

In order to make these analyses more accessible and faster, detection and counting automation using digital methods has been considered. This can be achieved by expert systems, various advanced thresholding techniques, various image analysis and processing methods, and especially machine learning methods, notably based on artificial neural networks.

As for microfossils, the following document can notably be consulted: Beaufort, L. & Dollfus, D. (2004), Automatic Recognition of Coccoliths by Dynamical Neural Networks. Marine Micropaleontology, 51 (1-2), 57-73. This method is also described in patent application WO/2015-132,531 A1. However, such a method requires a large number of training images for the machine learning method. The patent application notably mentions the use of 10,000 images obtained by microscopy, and 100 images per morphological group. This large number of training images requires a very long preparation time and a significant number of preparatory operations: first thin sections must be prepared (notably by rock cutting, then impregnation and lapping) and observations are made with the microscope for each thin section. The constituents considered must then be manually identified for each image, which requires consistent work for an expert. In addition, this method requires images taken under several conditions: with different polarizations and in natural light, which requires acquiring several images of the same sample, which is time-consuming and involves adapted equipment.

Regarding a machine learning method applied to minerals, the following document can be consulted: Thompson, S., Fueten, F. & Bockus, D. Mineral Identification Using Artificial Neural Networks and the Rotating Polarizer Stage. Computers & Geosciences, 27 (9), 1081-1089. Similarly, this method requires a large number of training images (at least several hundred, or even several thousand), which involves the same drawbacks as those mentioned above.

Another method is described in the document: Carvalho, L. E., Fauth, G., Fauth, S. B., Krahl, G., Moreira, A. C., Fernandes, C. P. & Von Wangenheim, A. (2020), Automated Microfossil Identification and Segmentation using a Deep Learning Approach. Marine Micropaleontology, 101,890, https://doi.org/10.1016/j.marmicro.2020.1018900. It is a method of detecting foraminifera on scanned core sample sections, based on an image segmentation method. This method also requires a large number of training images.

Furthermore, patent application EP-36,737,154 describes a system and a method for determining the type of microfossils by applying a machine learning technique. However, this method requires partitioning the acquired images into image data, which again requires the intervention of a user.

SUMMARY OF THE INVENTION

The present invention detects, to classify and count geological constituents of a rock sample, automatically, with limited preparation time and a limited number of operations (using a single image per rock sample). The invention therefore relates to a method of detecting and counting a geological constituent of a rock sample, by use of a location detection machine learning method.

The present invention relates to a method of detecting and counting at least one geological constituent of a rock sample from training images, with each geological constituent belonging to a geological constituent class. For this method, the following steps are carried out:
a) surrounding in the training images each geological constituent by using a predetermined geometric shape;
b) associating with each predetermined geometric shape in the training images the class of the surrounded geological constituent;
c) training a location detection machine learning algorithm for detecting at least one geological constituent and associating a class with the geological constituent by use of the predetermined geometric shapes and the associated classes of the training images;
d) acquiring an image of the rock sample;

e) applying a location detection model constructed from the machine learning algorithm to the acquired image of the rock sample to surround at least one geological constituent with the predetermined shape associated with a geological constituent class; and f) counting a number of geological constituents for each class for the acquired image of the rock sample.

According to an embodiment, the geological constituent classes are selected from among microfossils, nanofossils, plant debris, minerals, pollen spores and subdivisions of these elements.

According to an implementation, a color is associated with each geological constituent class.

According to a feature, the machine learning algorithm uses an artificial neural network, preferably a convolutional neural network, a fully convolutional neural network or a region-based convolutional neural network.

According to an embodiment option, the location detection model involves the following steps:

i) generating at least one region of predetermined geometric shape comprising a geological constituent and associating a class with each region of interest;

ii) adjusting at least one of the position and at least a dimension of the region of interest in order to surround the geological constituent.

According to an embodiment option, the location detection model generates at least one predetermined geometric shape for surrounding a geological constituent.

Advantageously, the predetermined geometric shape is selected from among a square, a rectangle, an ellipse, a polygon, and a circle.

According to an embodiment, the image of the rock sample is acquired from a thin section of the rock sample.

According to an implementation, the image of the rock sample is acquired by using an optical or electron microscope, using light that may polarize, a photograph, a scan, synchrotron tomography or X-ray imaging.

According to an aspect, the method comprises at least one additional step selected from among:

extracting portions of the acquired image of the rock sample comprising the at least one geological constituent, and constructing an image database for the at least one geological constituent with the portions extracted from the acquired image of the rock sample; or determining at least one of morphological and textural characteristics of the at least one geological constituent; or applying a supervised classification method to categorize the at least one geological constituent;

determining at least one physical property of the rock; or determining a deformation of the at least one geological constituent.

Furthermore, the invention relates to a soil or subsoil exploitation method wherein the following steps are carried out:

a) detecting at least one geological constituent of a rock sample by use of the detection method according to one of the above features; and b) exploiting the soil or the subsoil according to the detection of the geological constituent of the at least one rock.

Advantageously, the soil or subsoil exploitation concerns the construction of a structure on the soil or in the subsoil, the storage of gas in the subsoil or the exploitation of raw materials of the soil or the subsoil, preferably the raw materials being the rock itself, or a material or a fluid contained in the soil or the subsoil.

The invention further relates to a method of determining the climate in a geographical area through geologic ages, wherein the following steps are carried out:

a) taking at least two rock samples at different depths of an underground formation;

b) detecting at least one geological constituent for each rock sample by using the detection method according to one of the above features; and c) determining the climate and the geologic age in the geographical area according to the at least one detected geological constituent detected.

BRIEF DESCRIPTION OF THE DRAWINGS

Other features and advantages of the method according to the invention will be clear from reading the description hereafter of embodiments given by way of non limitative example, with reference to the accompanying figures wherein:

FIG. 1 illustrates the steps of the detection method according to an embodiment of the invention;

FIG. 2 illustrates a first variant of the predetermined geometric shape used in the method according to the invention;

FIG. 3 illustrates a second variant of the predetermined geometric shape used in the method according to the invention; and FIG. 4 illustrates an acquired image of a rock sample and the geological constituents detected using the method according to an embodiment of the invention.

DETAILED DESCRIPTION OF THE INVENTION

The present invention relates to a method of detecting and counting geological constituents of a rock sample. A rock sample is understood to be a piece of rock obtained by core drilling for example (not limitative). Geological constituents are understood to be at least one constituent contained within the rock. Such a geological constituent of rocks can be selected from among the following geological constituent classes: microfossils, nanofossils, plant debris, minerals, pollen spores, or any subdivision of these elements: different types of microfossils, different types of nanofossils, different types of plant debris, different types of minerals, different types of pollen spores, or any similar element. Preferably, the geological constituents can be small in size and can notably be millimetric or even microscopic in size. Detection of geological constituents locates the geological constituents within the rock sample. The method according to the invention also allows identifying the class of the geological constituents that are detected, and to count the number of geological constituents for each class.

The detection method according to the invention is based on the use of an image of the rock sample and on the implementation of a machine learning algorithm for automating this detection.

According to an embodiment of the invention, the acquired image of the rock sample and all the training images used for training the machine learning algorithm can be of any type.

According to an implementation of the invention, the image can be that of an entire rock sample. In a variant, the image can be that of a core sample taken in an underground formation. Alternatively, the image can be that of a thin section of the rock sample. The samples observed can notably be slices referred to as thin sections of three types:

very thin sections of materials of the order of 30 µm, thicker sections of the order of 100 µm, or polished sections whose thickness can be up to 10 mm. To be able to correctly observe these various types of samples under a microscope, it is important to have a flat surface with very low roughness (almost smooth).

Furthermore, the image can be obtained in different manners, for example by using an optical or electron microscope, using light which may be polarized, using a scan, a photograph, synchrotron tomography, or X-ray imaging, or any similar system.

According to a first preferred embodiment of the invention, the image can be obtained by a microscope from a thin section of the rock sample. Small-size geological constituents, also referred to as microscopic geological constituents, can thus be detected and counted more easily.

According to a second preferred embodiment of the invention, the image can be obtained by scanning a core sample taken from an underground formation.

According to the invention, the detection method comprises the following steps:
1—Training the machine learning algorithm
2—Acquiring the rock sample image
3—Detecting and counting the geological constituents of the rock sample.

In a more detailed manner, the method according to the invention comprises the following steps:
1—Training the machine learning algorithm
   1.1—Surrounding the geological constituents of the training images
   1.2—Associating a class
   1.3—Training the machine learning algorithm
2—Acquisition of the rock sample image
3—Detecting and counting the geological constituents of the rock sample
   3.1—Location detection and association of a class
   3.2—Counting the geological constituents.

Step 1 and the associated sub-steps 1.1 to 1.3 can be carried out offline, once and beforehand. Steps 2 and 3, and the associated sub-steps 3.1 and 3.2, can be carried out online, for each rock sample being considered. In other words, if the geological constituents of several rock samples are to be detected (several thin sections of the same rock for example), steps 2 and 3 are repeated for each rock sample, and the machine learning algorithm can be trained only once. The steps are described in detail in the rest of the description below.

According to an embodiment, for which the machine learning algorithm is already trained (which involves that the location detection model has already been constructed), the steps of the method can be limited to:
2—Acquisition of the rock sample image
3—Detecting and counting the geological constituents of the rock sample
   3.1—Location detection and association of a class
   3.2—Counting the geological constituents.

The method according to the invention can be implemented by using a computing system, notably a computer, in particular steps 1.3, 2 and 3 (3.1 and 3.2).

FIG. 1 schematically illustrates, by way of non-limitative example, the steps of the detection method according to an embodiment of the invention. The offline steps Off are first carried out from the training images IAP. For each training image, the geological constituents are surrounded ENT by means of a predetermined shape. A class is subsequently associated ASS with each predetermined shape. The location detection machine learning algorithm ALG is then trained. A rock sample image IER is acquired online Onl. By applying the model MOD resulting from machine learning algorithm ALG to the acquired rock sample image IER, the geological constituents cge of the rock sample and their associated class cla are detected and counted.

1-Training the Machine Learning Algorithm

This step trains the machine learning algorithm to automate the detection, the classification and the counting of geological constituents from the training images such as from at least 10 training images for example. At the end of this step, the machine learning algorithm forms a location detection model having as input a rock sample image, and as an output the detection and classification of the geological constituents.

In addition, the method according to the invention can comprise a preliminary step of training image acquisition, which can be carried out in the same manner as rock sample image acquisition step 2. For example, this preliminary step can prepare thin sections and performing microscopy of these thin sections to form the training images.

According to an embodiment of the invention, the machine learning algorithm can be a supervised machine learning classification algorithm, for example an artificial neural network, preferably a convolutional neural network (CNN), a fully convolutional neural network (FCNN), or a region-based convolutional neural network (R-CNN). The convolutional neural network, the fully convolutional neural network and the region-based convolutional neural network are particularly suitable for image processing.

Alternatively, the machine learning algorithm can be of any type, notably a non-convolutional neural network, a random forest method, a support vector machine (SVM) method, or a Gaussian process method.

As a variant, the machine learning algorithm can be an unsupervised classification algorithm.

1.1—Surrounding the Geological Constituents of the Training Images

This step surrounds in the training images each geological constituent by using a predetermined geometric shape. The predetermined geometric shape delimits the training image portions comprising a geological constituent. Preferably, the same predetermined geometric shape can be used for all the geological constituents, and only the dimensions of the predetermined geometric shape vary from one geometric shape to another according to the dimensions of the geological constituents. Preferably, this step can be carried out by a user.

According to an embodiment, the predetermined geometric shape can be selected from among a square, a rectangle, an ellipse, a polygon, a circle, or any similar shape. Preferably, the predetermined geometric shape can be an ellipse. Indeed, such a shape allows the geological constituent to be surrounded as closely as possible, which facilitates detection of the geological constituents.

FIG. 2 schematically illustrates, by way of non-limitative example, two portions of a training image. The left-hand image of the figure is the portion of the training image. This image 1 of the training image comprises a geological constituent 2. The right-hand image of the FIG. 1 is the portion of the training image in which the predetermined geometric shape 3, a rectangle here, surrounding geological constituent 2 is shown.

FIG. 3 schematically illustrates, by way of non-limitative example, two portions of a training image. The left-hand image of the figure is the portion of the training image. This image 1 of the training image comprises a geological constituent 2. The right-hand image of the is the portion of the training image in which the predetermined geometric shape 3, an ellipse here, surrounding geological constituent 2 is shown.

1.2—Associating a Class

This step associates with each predetermined geometric shape of each training image a geological constituent class. In other words, the class of the geological constituent surrounded by the predetermined geometric shape is identified (for example: microfossil, nanofossil, minerals, or the type of nanofossil, the type of minerals, the type of plant debris, etc.), and the class of the geological constituent thus identified is associated with the predetermined geometric shape. Thus, the learning algorithm allows detection and classification of the geological constituents. Preferably, this step can be carried out by a user.

According to an embodiment, a color can be associated with each geological constituent class. For this embodiment, the predetermined geometric shape can be of the color corresponding to the identified geological constituent class. Visualisation of the various geological constituent classes is thus facilitated.

In a variant, a parameter can be associated with each geological constituent class. For this variant embodiment, the parameter corresponding to the geological constituent class can be associated with the predetermined geometric shape.

1.3—Training the Learning Algorithm

This step trains the location detection learning algorithm by using the training images according to the predetermined geometric shapes and to their associated geological constituent classes. In other words, each detected object is characterized by a geometric shape described by its coordinates and at least one descriptor, such as notably at least one dimension, and by a class. Training of the learning algorithm allows construction of a model for location detection of the geological constituents.

Training of the machine learning algorithm can be performed notably by use of one of the following methods:

The method notably described in the document: "J. Redmon, A. Farhadi YOLOv3: An Incremental Improvement. Eprint arXiv, cs.CV, 1804.02767". It is a so-called "one-step" method for real-time detection of objects in images. The method applies a neural network to an entire image. The image can be divided into a grid with 19×19 regions, and five boxes locating the objects of interest per cell of the grid can be predicted. A classification is also predicted for each box. In total, 1805 boxes are predicted per image, but many contain no object or are redundant. Filtering is finally applied to all the predictions to keep only the relevant boxes. These boxes represent the objects of interest in the image. This "one-step" method allows the inference performance of the detection step to be improved;

The method notably described in the document: "S. Ren, K. He, R. Girshick, J. Sun Faster R-CNN: Towards Real-Time Object Detection with Region Proposal Networks. Eprint arXiv, cs.CV, 1506.01497". It is a so-called "two-step" method based on a single neural architecture used for two successive tasks:

application of the neural network and of a neural Region Proposal layer to generate a set of proposals (2000 for example) of regions of interest from an image. These regions comprise the objects to be detected and they are filtered to eliminate the non-relevant and redundant regions, application of the neural network and of a Spatial Pooling layer to classify each region of interest and to adjust at least one of the position and at least one dimension of the region of interest from the image used in the previous step. This "two-step" method allows the detection accuracy to be improved.

2—Acquisition of the rock sample image

This step acquires an image of the rock sample to be analysed. One of the image acquisition methods suited to the method according to the invention can be implemented: optical or electron microscope, light that may be polarized, a photograph, a scan, synchrotron tomography, X-ray imaging, etc. Furthermore, an image can be directly acquired from the rock sample or from a thin section of the rock sample.

According to an embodiment of the invention, when the detection method of the invention uses thin section images, this step comprises a sub-step of preparing a thin section from the rock sample to be analysed.

3—Detecting and Counting the Geological Constituents of the Rock Sample

This step detects, classifies and counts automatically the geological constituents of the rock sample, by use of the acquired rock sample image and a location detection model constructed from the machine learning algorithm. Thus, a location detection model formed from the learning algorithm is applied to the acquired rock sample image. A single acquired rock sample image is sufficient to detect the geological constituents.

For the embodiment implementing the method for thin rock sections, this step and the previous one can be carried out for thin sections of a single rock in order to improve the detection and counting representativity for the geological constituents of the rock.

3.1—Location Detection and Association of a Class

This step applies the location detection model formed by the machine learning algorithm obtained in step 1.3 to the rock sample image acquired in step 2. Thus, at least one geological constituent of the acquired rock sample image is automatically surrounded by the detection model by using a predetermined geometric shape, and a geological constituent class is automatically associated with the predetermined geometric shape. Preferably, the predetermined geometric shape is identical to the predetermined geometric shape used in step 1.1. Only the dimensions of the predetermined geometric shape are varied from one geological constituent to another to adapt to the dimensions of the geological constituent. At the end of this step, a new image comprising the acquired rock sample image, in which the predetermined geometric shapes are superposed, can be formed.

For the embodiment wherein a color or a parameter is associated with a class, it is also possible to assign the color or the parameter to each predetermined geometric shape identified in the acquired rock sample image. Within the context of color association, visualization and counting of the various geological constituent classes of the acquired rock sample image is facilitated.

3.2—Counting the Geological Constituents

This step automatically counts the number of geological constituents for each geological constituent class for the acquired rock sample image. In other words, the number of predetermined geometric shapes identified in step 3.1 for each geological constituent class for the rock sample image acquired in step 2 is counted. A distribution of the geological constituents can thus be obtained for a rock sample to be analyzed.

FIG. 4 schematically illustrates, by way of non-limitative example, in the left image thereof, an acquired image 4 of a rock sample and, in the right image thereof, the image 9 of image 4 with the predetermined geometric shapes surrounding the geological constituents. The acquired image 4 was obtained by microscopy of a thin section of the rock sample. Image 9 was obtained by use of the detection and counting method according to the invention. For the detection method according to the invention, the machine learning algorithm has been trained with 15 training images. Furthermore, a convolutional neural network and the "two-step" method have been implemented. In image 9, the geological constituents are identified by rectangles (predetermined geometric shape) 5, 6, 7 and 8. Each rectangle type corresponds to a foraminifer (a type of microfossil) class. The method according to the invention allows determination of the following distribution:

six foraminifera of the class corresponding to the rectangles bearing reference 5, ten foraminifera of the class corresponding to the rectangles bearing reference 6, one foraminifer of the class corresponding to the rectangle bearing reference 7, and six foraminifera of the class corresponding to the rectangles bearing reference 8.

Thus, the method according to the invention allows detection and counting automatically the geological constituents of a rock sample image.

Furthermore, the method according to the invention can comprise at least one of the following additional steps:

determining the proportion of the rock sample volume occupied by the geological constituents, from the detection of the geological constituent, in other words from the acquired image;

estimating morphological and textural characteristics (for example shape, dimensions, presence of scratches, etc.) of the geological constituents, using image processing for example;

extracting portions of the acquired rock sample image comprising a geological constituent, and constructing a database of geological constituent images from the portions extracted from the acquired rock sample image;

applying a supervised classification method for finer categorization of the geological constituents from the detection of the geological constituent. For example, the subspecies to which each detected microfossil belongs can be determined. This step may require preliminary training of an artificial neural network to perform this categorization, from a dedicated image base, independently of the learning algorithm of the detection and counting method according to the invention;

determining at least one physical property of the rock. Indeed, detection and counting of the geological constituents allows determination of physical properties, notably porosity, compaction, mechanical strength or permeability according to the type and the shape of the geological constituents detected; and determining a deformation of the geological constituent that may have occurred between the time of deposition of the geological constituent and the time of analysis of the geological constituent. For example, the shape of the geological constituent can be analysed and compared with other geological constituents belonging to the same class.

These steps can be carried out automatically, preferably using computing means such as with a computer.

Moreover, the invention relates to a soil or subsoil exploitation method. For this method, the following steps are carried out:
  a) detecting at least one geological constituent of a rock sample by use of the detection method according to any one of the above variants or variant combinations; and
  b) at least one of exploiting the soil and the subsoil according to the geological constituents of the rock sample detected in the previous step.

The first step notably allows determination of the physical properties of the rock to be analysed, and the exploitation thereof being performed according to these physical properties.

For this soil or subsoil exploitation method, the method can comprise a preliminary step of taking a rock sample from the soil or the subsoil.

Exploitation can notably concern the field of buildings or engineering structures construction, or the exploitation of raw materials, or the field of gas storage, of risk determination, or the field of site remediation, etc.

In the field of construction, the composition of at least one rocky outcrops and the subsoil is determined by categorization of the rock, and construction is achieved by adapting notably the foundations and the structure of the construction according to the rock categorization. For these applications, the sample of the rock to be categorized can be taken from the soil or the subsoil at a shallow depth.

In the field of raw material exploitation (for example for quarries, mines, hydrocarbon recovery, etc.), the composition of at least one of the rocky outcrops and of the subsoil is determined by detection of the geological constituents of the rock, and exploitation of the raw materials (which can be the rock itself, a material, for example a metal or a fluid, hydrocarbons for example, present in the subsoil) is achieved by allowing notably to determine the appropriate zones (i.e. drilling zones, zones to be dug for mines or quarries, etc., for raw material recovery), and to determine the methods and tools to be used (for example enhanced oil recovery, drilling tools, nature of the explosives for mines or quarries, etc.). For these applications, the sample of the rock to be categorized can be taken from deep in the subsoil, from drill cuttings, or from an outcrop, etc.

In the field of gas storage, $CO_2$ for example, the subsoil composition is determined by categorization of the rock, and the gas is stored in the subsoil in a suitable zone, that is an underground zone providing leak-free gas storage.

In the field of risk determination, the composition of a rocky outcrop (cliff) is determined by categorization of the rock, and a consolidation operation is performed if there is a risk of subsidence or collapse of the rocky outcrop.

This method thus enables at least one soil and subsoil exploitation in a fast and simple manner, without calling on an expert geologist. The method also allows faster processing of very large amounts of rocks.

The invention also relates to a method of determining the climate in a geographical area through geologic ages, wherein the following steps are carried out:
  a) taking at least two rock samples at different depths of an underground formation, which can be obtained from the same rock deposit succession;
  b) detecting at least one geological constituent for each rock sample by using the detection method according to any one of the above variants or variant embodiments; and
  c) determining the climate and the geologic age in the geographical area according to the at least one geological constituent detected.

It is clear that the invention is not limited to the embodiments described above by way of example and that it encompasses any variant embodiment.

The invention claimed is:

1. A method of detecting and counting at least one geological constituent of a rock sample from training images acquired from sections of the rock sample with each geological constituent belonging to a geological constituent class, comprising:
   a) surrounding in the training images each geological constituent by using a predetermined geometric shape selected from either an ellipse or a circle;
   b) associating with each predetermined geometric shape in the training images the class of each surrounded geological constituent;
   c) training a location detection machine learning algorithm for detecting at least one geological constituent and associating a class by use of the predetermined geometric shapes and the associated classes of the training images;
   d) acquiring an image of the rock sample;
   e) applying a location detection model constructed from the location detection machine learning algorithm to the acquired image of the rock sample which surrounds at least one geological constituent by the predetermined geometrical shape and associating a geological constituent class with the predetermined geometrical shape and the at least one geological constitutent is either microscopic or has millimetric dimensions; and
   f) counting at least one geological constituent for each class of the acquired image of the rock sample.

2. A method as claimed in claim 1, wherein geological constituent classes are selected from microfossils, nanofossils, plant debris, minerals, pollen spores and subdivisions of these elements.

3. A method as claimed in claim 1, wherein a color is associated with each geological constituent class.

4. A method as claimed in claim 2, wherein a color is associated with each geological constituent class.

5. A method as claimed in claim 1, wherein the location detection machine learning algorithm uses an artificial neural network, chosen from one of a convolutional neural network, a fully convolutional neural network and a region-based convolutional neural network.

6. A method as claimed in claim 5, wherein the location detection machine learning algorithm uses an artificial neural network, chosen from one of a convolutional neural network, a fully convolutional neural network and a region-based convolutional neural network.

7. A method as claimed in claim 1, wherein the location detection machine learning algorithim comprises:
   i) generating at least one region of the predetermined geometric shape of the circle or the ellipse comprising a geological constituent and associating a class with each region; and
   ii) adjusting at least one of a position and a dimension of each region to surround the geological constituent.

8. A method as claimed in claim 2, wherein the location detection machine learning algorithim comprises:
   i) generating at least one region of the predetermined geometric shape of the circle or the ellipse comprising a geological constituent and associating a class with each region;
   ii) adjusting at least one of a position and a dimension of each region to surround the geological constituent.

9. A method as claimed in claim 1, wherein the location detection machine learning algorithm generates the circle or the ellipse which surrounds each geological constituent.

10. A method as claimed in claim 1, wherein the image of the rock sample is acquired by using an optical or electron microscope, light, a photograph, a scan, synchrotron tomography or X-ray imaging.

11. A method as claimed in claim 1, wherein the method comprises at least one of:
   extracting portions of the acquired image of the rock sample comprising the at least one geological constituent, and constructing an image database for the at least one geological constituent of the portions extracted from the acquired image of the rock sample;
   determining at least one morphological and textural characteristic of the at least one geological constituent;
   applying a supervised classification method which categorizes the at least one geological constituent;
   determining at least one physical property of the rock; and
   determining a deformation of the at least one geological constituent.

12. A soil or subsoil exploitation method, comprising:
   a) detecting at least one geological constituent of the rock sample with a detection method according to claim 1; and
   b) exploiting the soil or the subsoil according to the detected at least one geological constituent of the rock sample.

13. A soil or subsoil exploitation method, comprising:
   a) detecting at least one geological constituent of the rock sample with a detection method according to claim 2; and
   b) exploiting the soil or the subsoil according to the detected at least one geological constituent of the rock sample.

14. A soil or subsoil exploitation method, comprising:
   a) detecting at least one geological constituent of the rock sample with a detection method according to claim 3; and
   b) exploiting the soil or the subsoil according to the detected at least one geological constituent of the rock sample.

15. A soil or subsoil exploitation method, comprising:
   a) detecting at least one geological constituent of the rock sample detection method according to claim 4; and
   b) exploiting the soil or the subsoil according to a detected at least one of the geological constituent of the rock sample.

16. A soil or subsoil exploitation method as claimed in claim 12, wherein the soil or subsoil exploitation comprises construction of a structure on the soil or in the subsoil, the storage of gas in the subsoil or the exploitation of raw materials in the soil or in the subsoil.

17. A method of determining climate in a geographical area through geologic ages, comprising:
   a) taking at least two rock samples at different depths from an underground formation;
   b) detecting at least one geological constituent for each rock sample at different depths by using the detection method according to claim 1; and
   c) determining climate in the geographical area according to the at least one detected geological constituent.

18. A method of detecting and counting at least one geological constituent of a rock sample from training images acquired from sections of the rock sample with the at least one geological constituent belonging to a geological constituent class, comprising:

a) surrounding in the training images each geological constituent by using a geometric shape selected from a polygon, a circle, and an ellipse;
b) associating with each predetermined geometric shape in the training images the class of the each surrounded geological constituent;
c) training a location detection machine learning algorithm for detecting at least one geological constituent and associating a class by use of predetermined geometric shapes and the associated classes of the training images;
d) acquiring an image of the rock sample;
e) applying a location detection model constructed from the location detection machine learning algorithm to the acquired image of the rock sample which surrounds the at least one geological constituent by the predetermined geometrical shape and the at least one geological constituent is either microscopic or has millimetric dimensions and associating a geological constituent class with the predetermined rock sample; and
f) counting the at least one geological constituent for each class of the acquired images of the rock sample.

* * * * *